Jan. 28, 1969     R. J. NEFF     3,424,426
ELECTRICALLY-OPERATED VALVE
Filed July 19, 1965
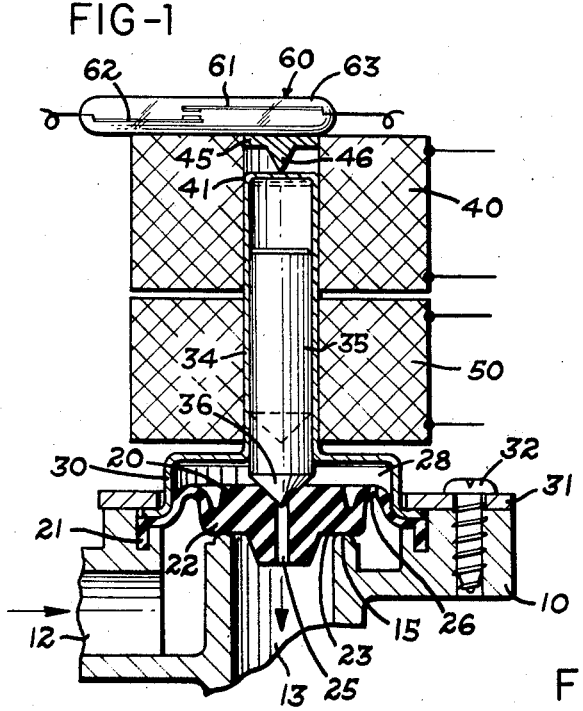
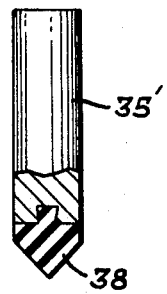
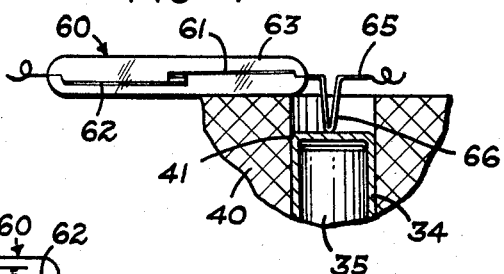
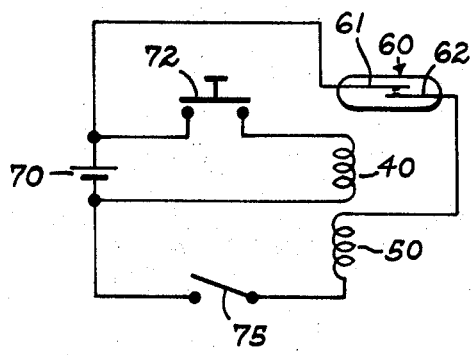
INVENTOR.
ROBERT J. NEFF
BY
*Marechal, Biebel, French & Bugg*
ATTORNEYS

United States Patent Office 3,424,426
Patented Jan. 28, 1969

3,424,426
ELECTRICALLY-OPERATED VALVE
Robert J. Neff, R.R. 1, Medway, Ohio 45341
Filed July 19, 1965, Ser. No. 473,021
U.S. Cl. 251—30       5 Claims
Int. Cl. F16k *31/12, 31/08*

ABSTRACT OF THE DISCLOSURE

A diaphragm-type solenoid flow-control valve requiring low power for operation on dry cells or the like embodies a permanent magnet valve member, a soft iron retainer for holding the valve member in the moved position, a pair of oppositely-effective electric coils for raising and lowering the valve member, and a magnetically operated reed switch in the magnetic field of the valve member and of one of the coils with its contacts in the circuit to the other coil.

---

This invention pertains to electrically-operated valves and more particularly to a flow control valve and valve actuator which operates with a minimum of electrical energy, such as one which may be operated over extended periods of time from dry cells.

Electrical flow-control valves, such as pilot-operated water shut-off valves used in washing machines, dishwashers and the like, commonly employ solenoid-operated pilot valves which have an actuating solenoid adapted for energization directly from a conventional alternating current household supply. Commonly, such valves and their associated solenoids are rated between 6.5 to 15 watts, and commonly remain energized during all times that the valve is open, permitting flow of water or other liquid therethrough. Such valves are unsuited for operation from a low-voltage low-power source, such as a single dry cell or a battery of such dry cells, due to the relatively high current which is required to operate the valve and to maintain it in an operated or open position.

It is therefore an important object of this invention to provide a pilot-operated valve and valve actuator which uses a minimum amount of electrical energy for operation, and which is particularly adapted for operation from a low-voltage direct current source such as one or more dry cells.

A further important object of this invention is the provision of a pilot-operated valve which is adapted to remain unenergized in either of two stable operating positions or conditions during the time that the valve is to remain in such positions, thereby reducing substantially the power requirements confining the power consumption to the times that the valve is being moved to a different position.

A more specific object of this invention is the provision of a valve and valve actuator in which a pair of direct current coils provide the power for the movement of a magnetized valve member with the relative positions of the electrical coil fields and the magnet field being in force-additive relationship, so that the valve member requires a minimum of electrical energy for operation.

A still further object of this invention is the provision of a valve actuator, as outlined above, in which a magnetic or magnetized valve member is retained in an operative position, or is held open, by the provision of a suitable piece of soft iron or other mutually attracted material, so that an actuating coil need be only momentarily energized to open the valve, and a closing coil may be similarly momentarily energized to break the attractive force between the pilot valve and the soft iron holding piece, to cause or permit the valve to close.

Another object of this invention is the provision of a valve and valve actuator, as outlined above, which incorporates a suitable magnetically operated switch, such as a magnetic reed switch, which is actuated by the permanent magnet in a movable valve member, in one position of this member, to provide a closed circuit which opens after a short interval of time, such as to reduce substantially the current required to close the valve after it has been opened.

These and other objects and advantages of the present invention will become apparent from the following description, the accompanying drawing and the appended claims.

In the drawings
FIG. 1 is a vertical section through the valve and valve actuator constructed according to this invention;
FIG. 2 is an electrical circuit diagram of the valve of FIG. 1;
FIG. 3 is a modified pilot valve member for the valve of FIG. 1; and
FIG. 4 shows a modified arrangement of the valve and reed switch arrangement of FIG. 1.

Referring to the figures of the drawing which illustrate preferred embodiments of the invention, a pilot-operated valve is shown in FIG. 1 as having a body 10 forming a liquid or water inlet 12 and an outlet 13. The valve body 10 may thus conveniently be formed of a molded metal or plastic material, and forms in internal or inner annular land or sealing surface 15 in surrounding relation to the outlet 13.

The valve further includes an elastomeric diaphragm 20 which is positioned in flow-stopping relation to the outlet 13, and includes an outer annular flange portion 21 which forms a fluid tight seal with the body 10 and an inner enlarged central portion 22 which has a lower surface 23 movable into closing relation with the annular land or sealing surface 15 of the body 10. Further, the diaphragm 20 is formed with a central metering orifice 25 and one or more bleed orifices 26, as shown in FIG. 1.

The chamber or space 28 formed above the diaphragm 20 is sealed and closed by a suitable non-magnetic housing or sleeve 30 which has its lower flanged end secured in sealing relationship with the diaphragm 20 at the annular flange portion 21 and which is secured in place on the body by an annular keeper plate 31 and a series of screws 32. The housing 30 has an elongated upper extension 34 which forms means for guiding and retaining an elongated pilot valve member 35 for movement between a raised flow-permitting position, as shown in broken lines in FIG. 1, and a lowered position in which the conical tip 36 is in flow-stopping relation to the metering orifice 25. The valve member 35 is, in effect, a needle valve, and when it is in the raised position, flow is permitted from the inlet 12 to the outlet 13 by the force of the water or fluid at the inlet causing the diaphragm 20 to raise off its seat 15. However, when the valve member 35 closes the metering orifice 25, a differential pressure is established across the diaphragm by reason of the force of the fluid entering the chamber 28 through the bleed opening 26, causing the diaphragm to close against the annular seat 15.

In order to provide a valve actuator which is adapted for operation with a minimum of electrical energy, such as for use on low-voltage direct current, I provide a valve member 35 which is, or which incorporates, a permanent magnet. Preferably the entire valve member 35 is magnetized so as to form opposite poles at or adjacent the ends thereof. Alternately, the pilot valve 35 may be made as shown at 35' in FIG. 3, in which an upper portion forming a permanent magnet supports a lower conically-shaped non-magnetic end 38 at the lower end, formed, for example of rubber, copper, nylon, aluminum and the like. This construction may be preferred where the valve may be used in installations where particles of iron or iron rust may otherwise be attracted to the end 38 of the valve and interfere with the proper operation of the valve.

The actuator includes a first direct current coil 40 which is wound in surrounding relation to the elongated guide portion 34 of the housing 30, and is directly supported on the housing. The first coil 40 is effective, when momentarily energized, to move the valve member 35 off of its seat with the diaphragm, to open the metering orifice 25, and to raise the valve member to the position shown by the broken lines in FIG. 1. For this purpose, the coil 40, which is positioned at or adjacent the top 41 of the housing 30, is preferably polarized or connected in such a manner as to form a field having an opposite pole at the top thereof in relation to the magnetic pole of the magnet formed by the member 35. In other words, assuming that the top of the valve member 35 forms a north-seeking pole and the bottom thereof forms a south-seeking pole, the coil 40 will be wound and connected to a DC source in such a manner to provide and form a south-seeking pole at the top and a north-seeking pole at the bottom so that the magnetized member 35 is mutually attracted thereto and is quickly moved to its raised position with a minimum of expended energy.

Relatively low-force means for retaining the valve member 35 in the raised or open position includes a soft-iron pole piece 45 which is formed with a protruding portion or point 46 closely adjacent the top 41 of the housing 30. The magnetic valve member 35 will remain in its moved or open position after the current to the coil 40 is turned off due to the mutual attraction to the small soft-iron pole piece 45. The point of the iron piece 45 is formed with only sufficient metal to hold the member 35 up or raised when the actuating coils are not energized, and accordingly assures that the valve remains indefinitely and stable in the open position.

The actuating circuit further includes a second coil 50 which is preferably wound in axially spaced relation to the coil 40 on the housing 30 beneath the coil 40. The coil 50 is operable when momentarily energized to overcome the attractive force between the magnetic valve member 35 and the soft iron magnet retaining means 45 to cause the pilot valve to return to its original or closed position in engagement with the diaphragm 20. For this purpose, the coil 50 is preferably polarized the same as the coil 40, but since the coil 50 is axially displaced from the coil 40, the magnetic member 35 is urged downwardly with a force which is sufficient to overcome and break the attractive force between it and the pole piece 45 and to move the valve 35 into engagement with the diaphragm 20, thus shutting off the valve. Since only about 10% of magnetic force is required to close the valve than to open it, the coil 50 may be formed with a comparatively greater number of turns of finer wire than the coil 40. The member 30 will then remain indefinitely in the closed position until the coil 40 is again energized.

The actuating circuit further includes a magnetically operated switch, such as the reed switch 60, which includes magnetic iron contact leaves 61 and 62. The switch 60 is enclosed within a glass envelope 63 and is positioned on the upper surface of the coil 40 slightly offset from the center line of the coil to lie in the magnetic fields produced by the coil 40 and the valve member 35 when the member is in the raised position. When the coil 40 is energized, the leaves 61 and 62 are brought together by reason of the magnetic lines of force passing therethrough, and remain in this position to close the electric circuit as long as the magnetic member 35 remains in its operated or its raised position. However, as soon as the attractive force is broken by the momentary energization of the coil 50, the member 35 drops and the reed switch is removed substantially from the magnetic field of the permanent magnet and returns to its normally open position.

In FIG. 4, there is shown a modified arrangement in which one of the iron or ferrous leads 65 of the reed switch is formed with a downwardly-extending loop which is in contact with the top 41 of the housing 30. The loop 66 is thus in close proximity to the member 35 in its moved position, and forms a soft iron magnet retaining means in place of the piece 45 shown in FIG. 1.

A suitable wiring or operating diagram for the valve is shown in FIG. 2 as including a dry cell 70 which forms a source of low-voltage, low-power direct current for the operation of the valve. The cell 70 may be a single cell, or a battery of cells, as described above, which provides low-voltage direct current, which average 300 milliamperes or less for the operation of the valve. As shown in FIG. 2, the first or opening coil 40 is connected to the battery 70 through a push button switch 72, which may be momentarily closed to energize the coil 40 causing the valve to open. It is obvious that the push button may be automated or may form a part of a timing mechanism, such as the timer of a dishwasher, a washing machine, or the like. It is only necessary that the coil 40 be energized for a short period of time, such as less than one second, sufficient to build up the current through the coil 40 and to form an attractive force on the valve member 35 to cause it to move to its raised position, at which point it becomes self-holding with the soft iron pole piece 45 or the loop 66 in FIG. 4.

The valve will then remain in the open position permitting flow from the inlet 12 to the outlet 13 with no current flowing through either of its actuating coils. The reed switch 60 is shown as being placed in series with the coil 50, and the reed switch 60 will also remain closed at all times that the valve is open, as described above.

A further actuating switch 75 is shown as being in series with the coil 50 and the reed switch 60 and when closed applies the power from the cell 75 to the coil 50. However, as soon as the attractive force between the magnet and the pole piece is broken, the valve member 35 drops thereby almost immediately opening the reed switch 60 and removing the power from the second coil 50. Again, the switch 75 may be automated as in the case of the push button switch 72, and may remain closed but with no power passing through the coil 50 once the reed switch 60 is open. This takes place within a fraction of a second.

The invention is particularly useful in circumstances where it is desired to provide a battery-operated, low-voltage flow control circuit, and has particular use in the electric toilet apparatus which is described and claimed in the patent of Armstrong and Neff, No. 3,082,433 issued Mar. 26, 1963. For example, the valve of this invention may be used with advantage as the valves designated by the reference numerals 20, 40 and 110 of the above-mentioned Armstrong and Neff patent.

It has been estimated that an electric toilet constructed according to the said Armstrong and Neff patent using two valves constructed according to this invention operating from four D-size dry cells could be flushed twenty-five times a day with the dry cells lasting approximately fourteen months at an average of .3 of an ampere being drawn by each of the coils 40 and 50 during the time that they are energized, and assuming that the coils would be energized for one full second. However, as a practical matter, the coils are effective to operate the valve when they are energized for only a fraction of a second, and a correspondingly longer life could be expected from the dry cells under these conditions.

An advantage of the present invention is that it may also be used on alternating current such as by employing a step down transformer and a simple diode rectifier in place of the cell 70. Also, due to the low energizing voltages and currents required, the valve can be used in hazardous areas without special shielding.

It is therefore seen that this invention provides a pilot-operated, flow-control valve which is particularly adapted for use on low-voltage and battery operated systems and which uses a minimum of electrical energy. The valve is stable in both the open and the closed positions so that the current in the energizing coils may be turned off at all times except when the valve is to be opened or closed. The magnetic forces of the coils do not have any tendency to demagnetize the magnetic valve member, and the forces therebetween are ones of mutual attraction providing an efficient valve operation from a low energy source of power.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fluid control device adapted for operation from low voltage direct current comprising a non-magnetic housing, a valve movable in said housing between a flow stopping first position and a moved second position, means in said valve forming a permanent magnet defining poles adjacent the opposite ends of said valve, a first direct current coil mounted in surrounding relation to said housing and effective when energized to move said valve from its first to its second position, soft iron retaining means positioned to lie within the magnetic field of said valve in said second position for retaining said valve in said second position upon the removal of power from said first coil, a second direct current coil mounted in surrounding relation to said housing and effective when energized to overcome the said holding force of said retaining means and to move said valve to its said first position, circuit means connected to said first coil and effective for momentarily energizing said coil, further circuit means connected to said second coil including a magnetic reed switch positioned to lie within the magnetic field of said valve in said second position only thereof providing a closed circuit therethrough to said second coil at all times that said valve remains in said second position, said further circuit means including switch means effective momentarily to energize the second coil through said reed switch for causing movement of said valve to said first position followed by opening of said further circuit by the opening of said reed switch with said movement of said valve.

2. The device of claim 1 in which said reed switch is formed with soft iron leads and in which said magnetic retaining means includes one such lead of said reed switch formed as a loop extended into close proximity with said valve in the second position thereof.

3. A direct current pilot-operated valve adapted for operation on dry cells and the like, comprising a valve body having means forming an inlet and an outlet, a diaphragm in said body positioned in flow stoppable relation to said outlet and having means forming a metering orifice, a non-magnetic pilot valve housing, a pilot valve member in said housing movable between a first position in flow stopping relation to said orifice to a second position spaced from said orifice and integrally forming a permanent magnet associated and movable therewith, a first coil positioned on said housing to effect an attractive force on said valve member to move said member from its first position upon momentary energization thereof to said second position, soft iron means positioned so as to hold said valve member in said second position following removal of power from said first coil, a second coil spaced on said housing in relation to said first coil and effective upon momentary energization thereof to overcome the retaining force of said holding means to return said member to its first position, and a magnetic reed switch mounted within the magnetic field of said valve member in one of said valve positions only for operation in response to said valve member moving into said one position.

4. The valve of claim 3 in which said reed switch is mounted in the magnetic field of said first coil and in the magnetic field of said valve member in said moved position thereof and forming a circuit path to the said second coil at all times in which said valve means is in said moved position.

5. The valve of claim 3 in which said pilot valve member has a non-magnet valve tip engageable with said metering orifice to prevent accumulation of magnetic particles on said tip.

References Cited

UNITED STATES PATENTS

| | | | |
|---|---|---|---|
| 1,203,825 | 11/1916 | Warren | 251—137 X |
| 1,624,132 | 4/1927 | Brown | 251—137 X |
| 2,562,315 | 7/1951 | Kempton | 251—30 |
| 2,727,715 | 12/1955 | Tuthill | 251—141 |

FOREIGN PATENTS

| | | |
|---|---|---|
| 665,565 | 9/1938 | Germany. |

M. CARY NELSON, *Primary Examiner.*

MICHAEL O. STURM, *Assistant Examiner.*

U.S. Cl. X.R.

251—137